US009457371B2

(12) United States Patent
Curilla

(10) Patent No.: US 9,457,371 B2
(45) Date of Patent: Oct. 4, 2016

(54) HIGH SPEED RAIL CAR TOPPER APPLICATION SYSTEM

(71) Applicant: Darrell T. Curilla, Edmonton (CA)

(72) Inventor: Darrell T. Curilla, Edmonton (CA)

(73) Assignees: MCRL, LLC, Gillette, WY (US); Darrell T. Curilla, Edmonton, Alberta (CA)

( * ) Notice: Subject to any disclaimer, the term of this patent is extended or adjusted under 35 U.S.C. 154(b) by 0 days.

(21) Appl. No.: 14/849,158

(22) Filed: Sep. 9, 2015

(65) Prior Publication Data
US 2016/0067730 A1 Mar. 10, 2016

Related U.S. Application Data

(60) Provisional application No. 62/047,971, filed on Sep. 9, 2014.

(51) Int. Cl.
| | | |
|---|---|---|
| B05B 15/00 | (2006.01) | |
| B05B 15/08 | (2006.01) | |
| B05B 1/20 | (2006.01) | |
| B05B 15/04 | (2006.01) | |

(52) U.S. Cl.
CPC ............... *B05B 15/08* (2013.01); *B05B 1/20* (2013.01); *B05B 15/0406* (2013.01)

(58) Field of Classification Search
CPC ..... B05B 15/08; B05B 14/0425; B05B 1/28; B05B 15/0406; B05B 1/20
USPC ............. 239/750, 751, 753, 124–127, 587.5, 239/587.6, 589.1, 566; 137/312, 313, 314
See application file for complete search history.

(56) References Cited

U.S. PATENT DOCUMENTS

| | | | | |
|---|---|---|---|---|
| 3,584,787 A | * | 6/1971 | Thomason | .......... A01M 7/0064 118/326 |
| 3,961,752 A | * | 6/1976 | Doeksen | ................... B05B 1/28 118/303 |
| 4,168,798 A | * | 9/1979 | Moore | ................ A01M 7/0064 239/121 |
| 5,352,297 A | * | 10/1994 | Peters | .................. B05B 12/122 118/303 |
| 5,441,566 A | | 8/1995 | Vaughan | |
| 8,549,997 B2 | | 10/2013 | Nyquist | |
| 2007/0190261 A1 | * | 8/2007 | Darnell | .............. B05B 13/0207 427/424 |
| 2011/0126723 A1 | * | 6/2011 | Nyquist | ................. B65G 67/22 100/43 |

FOREIGN PATENT DOCUMENTS

| | | |
|---|---|---|
| KR | 10 2003 004 6361 | 6/2003 |
| KR | 20 034 4689 | 3/2004 |

\* cited by examiner

*Primary Examiner* — Arthur O Hall
*Assistant Examiner* — Viet Le
(74) *Attorney, Agent, or Firm* — Emerson Thomson Bennett, LLC; Daniel A. Thomson

(57) ABSTRACT

Provided is a spray system comprising: a frame, spray bar, and trough. The spray bar may be rotatable between a dispensing orientation and a diversion orientation and may comprise a pipe and a nozzle. The pipe may define a pipe interior, a pipe elongation axis, be operationally rotatable about the pipe elongation axis, be in fluid communication with an output of a fluid supply, adapted to accept an associated fluid from the fluid supply, and adapted to convey the associated fluid. The nozzle may be adapted to direct an output of the associated fluid from the pipe in a diversion direction or in a dispensing direction. The trough may comprise a trough inlet positioned along the diversion direction and adapted to accept associated fluid when the spray bar is in the dispensing orientation, and a trough outlet in fluid communication with the trough inlet and a fluid supply input.

3 Claims, 4 Drawing Sheets

HIGH SPEED RAIL CAR TOPPER APPLICATION SYSTEM

CROSS-REFERENCE TO RELATED APPLICATION

This application claims the benefit of U.S. Provisional Application No. 62/047,971, filed Sep. 9, 2014, entitled High Speed Dust Suppressing Spray System, which is hereby incorporated herein by reference.

BACKGROUND

A. Technical Field

The present subject matter is directed to methods and apparatuses for applying binding agents, topper agents, or other chemical product for the purpose of ensuring dust losses in transit are not more than a determined limit and achieve dust mitigation and suppression for cargo and other transported materials in material handling systems, such as without limitation, any means of container conveyance, such as trucks, barges, railroad cars, conveyor belts, or otherwise. The present subject matter is directed to methods and apparatuses for applying binding agents, topper agents, or other chemical product for the purpose of ensuring coal and coal dust losses in transit are not more than a determined limit and achieve coal dust mitigation and suppression for coal being transported in railroad cars and delivered to coal burning utilities, transfer terminals and facilities, export terminals and ports and other destinations.

B. Description of Related Art

Coal destined for domestic or international market is mined and loaded into open top gondola railway cars at the mine sites. The open top gondola cars expose the top surface of the coal pile to rain, wind, sun, and scouring air resistance as the train travels from the mine to the unloading facility. At the mines, a binding topper agent normally is applied to the surface of the loaded coal immediately after the loading operation. The binding topper agent serves to counteract the air scouring effect on the coal pile and minimize product lost from the cars on route. Various chemical formulations are used as the binding topper agent. Cost, travel distance, coal particle distribution, top of car profile, and climactic conditions influence the binding agent selection and concentration. The effectiveness of the mine-applied binding topper agents appears affected by coal settlement and movement within the railroad car, which occurs within the first several hundred kilometers of travel on route to unloading. There is possible need to also apply binding topper agent at a second location between the mine site of the rail car loading and the final destination where the coal will be unloaded.

It is sometimes desirable to be able to apply large volumes of a fluid, such as, and without limitation, a binding agent, to cargo in, or on, one or more railcars, trucks, barges, or other conveyances while avoiding unintended application or dispensing of the fluid between conveyances or on any of the personnel safety equipment of the conveyances or on operative components connecting the conveyances, or to the surrounding environment or workers, or anywhere else except the cargo. Such unintended application or dispensing of the fluid may be undesirable for any number of reasons but may include the desire to avoid wastage of the fluid.

It is sometime desirable to be able to dispense large volumes of a binding agent very quickly but to pause and restart dispensing operations frequently and with high precision and high accuracy. A non-limiting example of a dispensing operation in which it may be desirable to dispense large volumes of a binding agent very quickly but to pause and restart dispensing operations frequently and with high precision is application of an effective amount of a binding agent to the cargo in multiple open top gondola railway cars in a moving train.

SUMMARY

Provided is a spray system comprising: a frame, spray bar, and trough. The spray bar may be rotatable between a dispensing orientation and a diversion orientation and may comprise a pipe and a nozzle. The pipe may define a pipe interior, a pipe elongation axis, be operationally rotatable about the pipe elongation axis, be in fluid communication with an output of a fluid supply, adapted to accept an associated fluid from the fluid supply, and adapted to convey the associated fluid. The nozzle may be adapted to direct an output of the associated fluid from the pipe in a diversion direction or in a dispensing direction. The trough may comprise a trough inlet positioned along the diversion direction and adapted to accept associated fluid when the spray bar is in the dispensing orientation, and a trough outlet in fluid communication with the trough inlet and a fluid supply input.

Other benefits and advantages will become apparent to those skilled in the art to which it pertains upon reading and understanding of the following detailed specification.

BRIEF DESCRIPTION OF THE DRAWINGS

Example arrangements are described hereinafter with reference to the accompanying drawings.

DETAILED DESCRIPTION

Figure 1:
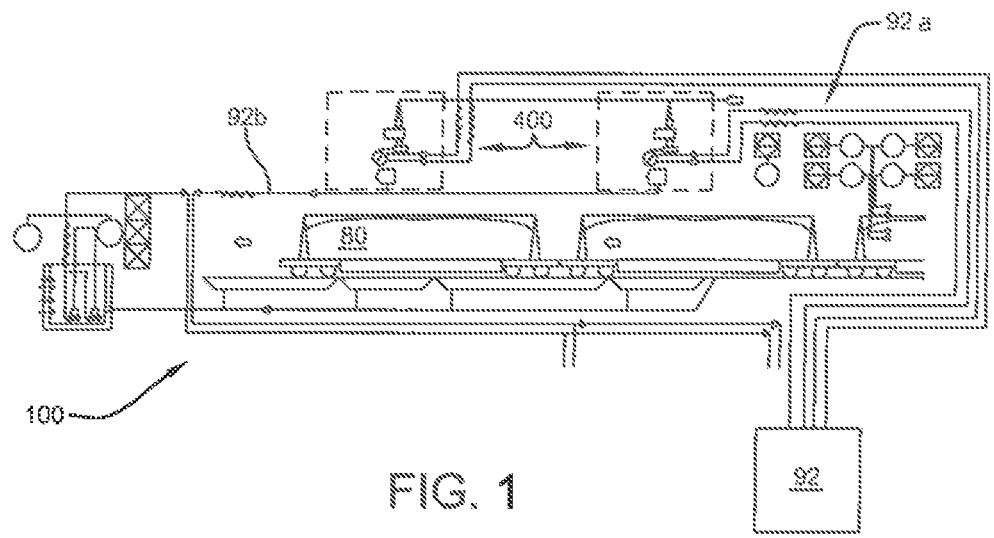
FIG. 1 shows a schematic of the piping and mechanical instrumentation for one embodiment of an associated dispensing system incorporating a spray system.

With reference to the non-limiting embodiments shown in FIGS. 1-4, a dispensing system 100 may take a variety of forms or embodiments. In some embodiments, such as without limitation, that shown in FIG. 1, a dispensing system 100 may comprise one or more spray systems 400. A spray system 400 may comprise a frame 410, a spray bar 440, and a trough 470. A spray system 400 may optionally further comprise an actuator 490.

Figure 2:
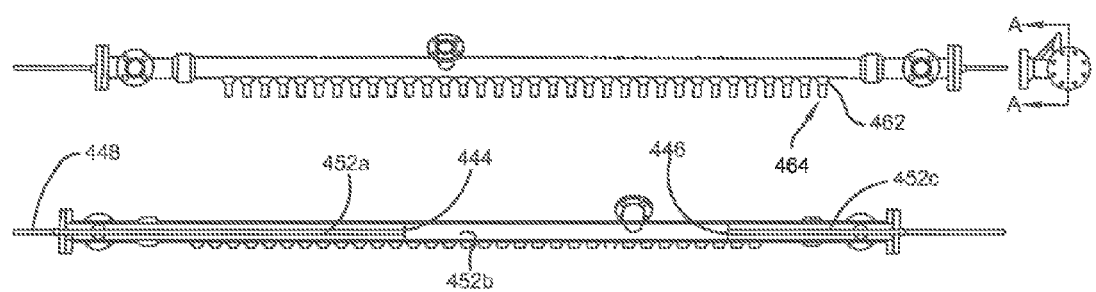
FIG. 2 shows a perspective view of one embodiment of a spray bar.
Figure 3:
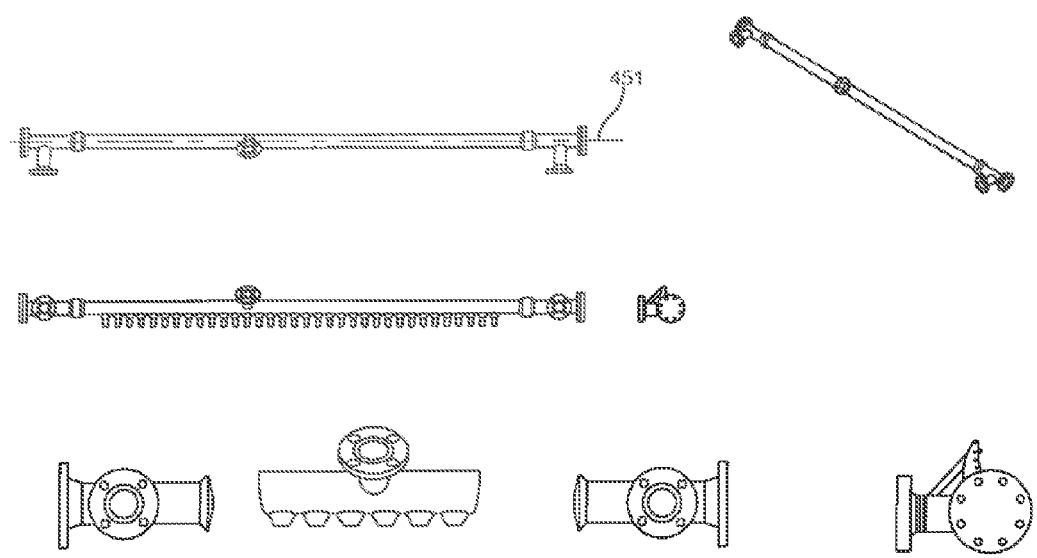
FIG. 3 shows a perspective view of one embodiment of a spray bar assembly; and, FIG. 4 shows a perspective view of one embodiment of a spray system.
Figure 4:
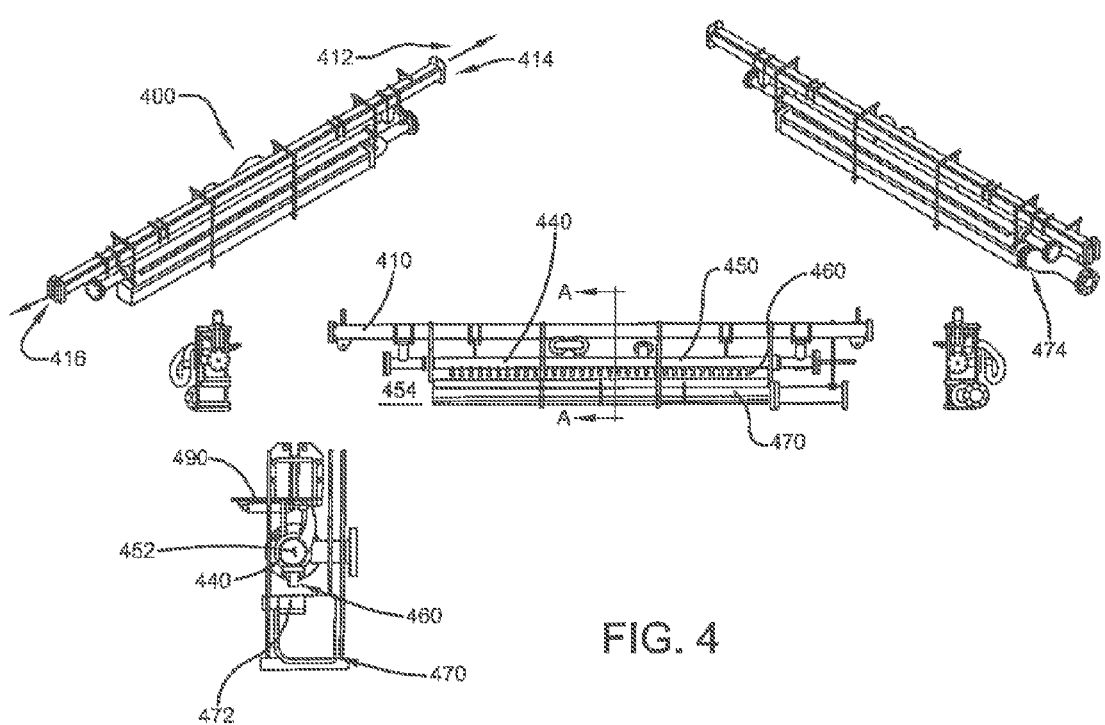

With continuing reference FIGS. 2-4, in one non-limiting embodiment a frame 410 provides a structure of sufficient rigidity and strength to support the other components of the spray system in their operational positions and orientations. Without limitation, in some embodiments the frame 410 may comprise one or more structural beams, bars, tubes, angles, or channels. Without limitation, in some embodiments the frame 410 may comprise steel, aluminum, or other engineering material. A frame 410 may be elongated to define a frame elongation axis 412. An elongated frame 410 may comprise a first frame end 414 opposite a second frame end 416.

A spray bar 440 may be rotatable with respect to the frame between a dispensing orientation and a diversion orientation. One non-limiting embodiment of a diversion orientation is shown in FIG. 4. In the diversion orientation, most, all, or a large quantity of an associated fluid dispensed from the spray bar 440 is recaptured within the spray system 400 without being dispensed. By contrast, in the dispensing orientation, most, all, or a large quantity of the associated fluid dispensed from the spray bar is output from the spray system 400 and may be applied to a subject target such as, without limitation, a container or cargo. In one non-limiting embodiment, the spray bar 440 may comprise a pipe 450 and one or more nozzles 460. In one non-limiting embodiment the spray bar 440 is adapted to dispense at least 340 US gallons (1287.04 L) per minute of an associated fluid. In one non-limiting embodiment the spray bar 440 is adapted to dispense at least 170 US gallons (643.52 L) per minute of an associated fluid.

The pipe 450 defines a pipe interior 452 and a pipe exterior 454. The pipe may be elongated to define a pipe elongation axis 451. In the embodiment shown in FIGS. 1-4, the pipe is operationally connected with frame 410 such that it is operationally rotatable with respect to the frame 410 about the pipe elongation axis 451. The pipe 450 may be in fluid communication with the output 92a of an associated fluid supply 92. The pipe 450 may be adapted to accept an associated fluid from the fluid supply 92 into a fluid input 456 in fluid communication with pipe interior 452. The pipe 450 may be adapted to convey an associated fluid from the fluid input 456, through the pipe interior 452, and to the one or more nozzles 460. The pipe 450 may be of those dimensions and materials chosen with good engineering judgment. In one non-limiting embodiment, the pipe 450 is a 4 inch (10.16 cm) diameter pipe.

The one or more nozzles 460 are in fixed engagement and orientation with respect to the pipe 450. Each nozzle is an elongated fluid conduit having a first nozzle end 462 in fluid communication with the pipe interior 452 and a second nozzle end 464 opposite the first nozzle end 462, where the second nozzle end 464 is open to issue the associated fluid either in the dispensing direction or in the diversion direction as dictated by the orientation of the spray bar 440. In the non-limiting embodiment shown in FIGS. 1-4, the spray bar comprises 36 open pipe nozzles 460 wherein each nozzle is perpendicular to the pipe elongation axis 451. Each nozzle 460 may be of those dimensions and materials chosen with good engineering judgment. In certain non-limiting embodiments, each nozzle 460 is ½ inch (1.27 cm) in diameter and 2 inches (5.08 cm) long. In certain embodiments, the nozzle 460 may be: a flat spray nozzle with pipe-size connections ranging from ¼ inch (0.635 cm) to ½ inch (1.27 cm); or a nozzle having a spray angle between 5° to 120° inclusive; or a nozzle having an output capacity between 1.0 GPM (3.79 LPM) to 25.0 GPM (94.63 LPM), inclusive; or a nozzle having some combination of these latter properties.

A spray bar 440 may optionally comprise one or more seal plates 444, 446. A seal plate 444, 446 may provide a substantially fluid-tight obstruction within the pipe interior 452. A seal plate 444, 446 may be adapted to fluidly isolate one part of pipe interior 452 from another part of pipe interior 452. In some embodiments, a seal plate 444, 446 may be an adjustable plate with fluid-tight seals moveable within the pipe interior 452. In some embodiments, as shown in FIG. 2, a spray bar may comprise a first seal plate 444 and a second seal plate 464 which separate pipe interior 452 into three regions 452a, 452b, 452c having lengths adjustable by adjusting the positions of one or more of the first seal plate 444 and the second seal plate 446. The position of a seal plate 444, 446 may be adjusted using one or more rods 448 or other mechanical connection. In some embodiments the rod 448 is coaxial with pipe 450 and extends outside of the pipe interior 452 through a fluid tight connection to permit the position of the associated seal plate 444, 446 to be adjusted along the pipe elongation axis 451 without draining the system or opening the pipe 450 or other fluid conveyance.

A trough 470 may comprise one or more trough inlets 472 in fluid communication with a trough outlet 474. The trough inlet 472 is positioned along the diversion direction and adapted to accept the output of the associated fluid when the spray bar 440 is in the diversion orientation. In the embodiment shown in FIGS. 1-4, the spray bar 440 is above the trough 470, the diversion direction is downward, and the trough inlets 472 open upward to accept associated fluid that may be dispensed from the nozzles 460. Accordingly, when the spray bar 440 is in the diversion orientation and dispensing as designed, all, most, or a large quantity of the dispensed associated fluid enters the trough 470 though one or more trough inlets 472. An associated fluid in the trough 470 may flow from the trough 470 through trough outlet 474. In the embodiment shown in FIGS. 1-4, the trough outlet 474 is in fluid communication with an input 92b of the fluid supply 92 such that some or all of the associated fluid dispensed while the spray bar is in the diversion orientation may be recaptured and, optionally, reused.

An actuator 490 may be operationally engaged with the spray system 400 to allow the spray bar to be rotated between the dispensing orientation and the diversion orientation. The actuator may be any actuator chosen with good engineering judgement. The actuator may comprise a stepper motor, an encoder, a servo motor, a mechanical linkage, a four-bar mechanism, a snap-through mechanism, a pneumatic cylinder, a hydraulic cylinder, an accumulator, or combinations thereof. In the embodiment shown in FIGS. 1-4, the actuator 490 is a pneumatic cylinder.

In some non-limiting embodiments the associated fluid dispensed by the fluid supply 92 may comprise a binding topper agent. There are many acceptable binding topper agents and forms of application. Generally, any binder topper agent selected with good engineering judgment is acceptable for use as the associated fluid adapted to be dispensed by the fluid supply 92. In some embodiments the chemical for the binding agent is a direct injection liquid concentrate. In one embodiment, the binding agent can be applied up to a 4.48% solution by volume. In other embodiments, the binding agent can be applied in a solution of 1-10% binding agent by volume. In certain embodiments, a binding agent may comprise a polymer: homopolymers, random, block, or graft co-polymers. In certain embodiments, a polymer to be used as a binding topper agent may be an emulsion in water or a solution, with or without the addition of a freezing point depressant, such as glycerin or glycol. In certain embodiments a polymer may comprise one or more of acrylic; vinyl acetate; vinyl acrylic; styrene butadiene; styrene acrylic; vinyl acetate—dioctyl maleate; polyacrylamide; polyacrylamide—crosslinked; polyvinyl acetate; or an alkyl alcohol composition. In certain embodiments, a binding agent may comprise an emulsion. An emulsion to be used as a binding topper agent may be a polymer as noted above, asphalt, tall oil pitch, petroleum oil petroleum, non-petroleum oil such as, without limitation, soy oil, canola oil, nut oil, synthetic fluid including GTL (gas to liquid), and synthetic fluid with binder. In certain embodiments, a binding agent may comprise base oils (petroleum derived) with one or more binders, base oils (petroleum derived) without one or more binders, synthetic fluids with one or more binders, synthetic fluids without one or more binders, lignosulfonates, acidulated soy feedstock, or soy processing by-products, surfactant based materials, glycerin based materials.

In some embodiments a binding agent, in concentrate form or otherwise, may be used for rapid disbursement with direct injection into a dilution water stream. The dilute solution is considered immediately active without minimum requirements for polymer unwind time.

With continuing reference to the FIGS. 1-4, the dispensing system 100 may comprise one or more spray systems 400, each capable of applying up to 100% of the design flow. Past experience found improved performance with two, lower volume applications of binding chemical compared to a single high volume flow.

In one method of use, a spray system 400 may be provided, an associated fluid may be dispensed from the nozzle 460 of the spray system 400, and a multi-step dispensing operation conducted in which the steps are: moving a gondola railway car 80 carrying cargo into a region along the dispensing direction; moving the spray bar 440 into the dispensing orientation to direct the associated fluid from the nozzle 460 into the dispensing direction and onto the cargo; moving a gondola railway car 80 carrying cargo out of the region along the dispensing direction; and moving the spray bar 440 into the diversion direction to direct the associated fluid from the nozzle 460 into the diversion direction and into the trough 470.

By establishing a high volume flow though the spray bar 400 it is possible to dispense very high volumes of an associated fluid very quickly. In some embodiments, control of output is established by redirecting the high volume flow though the spray bar 400 into a trough rather than making a large change in the flow volume though the spray bar 400.

In certain non-limiting applications, the dispensing system 100 may be deployable on a main line railroad track for use for application of material to cargo while the cars are moving at conventional conveyance speeds, for example and without limitation, at speeds up to 20 mph. In certain non-limiting applications, multiple dispensing systems 100 may be arranged on a main line railroad track to provide for a first dispensing system 100 positioned and adapted to make application of material to cargo and a second dispensing system 100 positioned some offset distance from the first dispensing systems 100 and adapted to make a secondary application of material to cargo. In certain non-limiting applications, the offset distance from the first dispensing systems 100 to the second dispensing system 100 may be less than a mile, a mile, more than a mile, or more than 100 miles. In certain non-limiting applications, the associated cargo to which material is to be applied may be coal in railcars, or other commodities such as met coal, pet coke, gypsum, or grain. In certain non-limiting embodiments, the dispensing system 100 may be adapted to apply an effective amount of a binder topper agent as an associated fluid to the associated cargo in an associated railcar in a train travelling at a speed from 0.3 mph (0.48 kph) to 20.0 mph (32.2 kph) in an effective amount to reduce or substantially eliminate dust from the cargo.

The embodiments have been described, hereinabove. It will be apparent to those skilled in the art that the above methods and apparatuses may incorporate changes and modifications without departing from the general scope of the present teachings. It is intended to include all such modifications and alterations insofar as they come within the scope of the appended claims or the equivalents thereof.

Having thus described the disclosed system and method, it is now claimed:

1. A spray system comprising:
a frame,
a spray bar rotatable between a dispensing orientation and a diversion orientation, the spray bar having,
a pipe, the pipe defining a pipe interior, the pipe being,
elongated to define a pipe elongation axis,
operationally rotatable about the pipe elongation axis,
the pipe further being,
in fluid communication with an output of a fluid supply
adapted to accept an associated fluid from the fluid supply, and
adapted to convey the associated fluid;
a nozzle,
in fluid communication with the pipe, and
adapted to direct an output of the associated fluid from the pipe
in a diversion direction when the spray bar is in the diversion orientation, and
in a dispensing direction when the spray bar is in the dispensing orientation;
a trough, the trough comprising
a trough inlet positioned along the diversion direction and adapted to accept the output of the associated fluid when the spray bar is in the dispensing orientation, and
a trough outlet in fluid communication with the trough inlet and in fluid communication with an input of the fluid supply.

2. A method of using a spray system comprising:
providing a spray system having
a frame,
a spray bar rotatable between a dispensing orientation and a diversion orientation, the spray bar having,
a pipe, the pipe defining a pipe interior, the pipe being,
elongated to define a pipe elongation axis,
operationally rotatable about the pipe elongation axis,
the pipe further being,
in fluid communication with an output of a fluid supply,
adapted to accept an associated fluid from the fluid supply, and
adapted to convey the associated fluid,
a nozzle,
in fluid communication with the pipe,
adapted to direct an output of the associated fluid from the pipe
in a diversion direction when the spray bar is in the diversion orientation, and
in a dispensing direction when the spray bar is in the dispensing orientation,
a trough, the trough comprising
a trough inlet positioned along the diversion direction and adapted to accept the output of the associated fluid when the spray bar is in the dispensing orientation, and
a trough outlet in fluid communication with the trough inlet and in fluid communication with an input of the fluid supply;
dispensing the associated fluid from the nozzle; and
conducting a dispensing operation having the steps of, moving a gondola railway car carrying cargo into a region along the dispensing direction, moving the spray bar into the dispensing orientation to direct the associated fluid from the nozzle into the dispensing direction and onto the cargo, moving a gondola railway car carrying cargo out of the region along the dispensing direction, and moving the spray bar into the diversion direction to direct the associated fluid from the nozzle into the diversion direction and into the trough.

3. A spray system comprising:

a frame,
   the frame being elongated to define a frame elongation axis,
   the frame having a first frame end and a second frame end;

a spray bar rotatable with respect to the frame between a dispensing orientation and a diversion orientation, the spray bar having,
   a pipe, the pipe defining a pipe interior and a pipe exterior, the pipe being 4 inches in diameter,
   elongated to define a pipe elongation axis,
   operationally connected with the frame to be operationally rotatable with respect to the frame about the pipe elongation axis,
   the pipe further being,
     in fluid communication with an output of a fluid supply
     adapted to accept an associated fluid from the fluid supply, and
     adapted to convey the associated fluid;
   a plurality of nozzles in fixed engagement with the pipe,
   the plurality of nozzle having at least 30 open pipe nozzles where each nozzle is a flat spray nozzle with pipe-size connections ranging from ¼ inch to ½ inch,
   having a spray angle between 5° to 120° inclusive, and
   having an output capacity between 1.0 GPM to 25.0 GPM, inclusive,
   the nozzles being in fluid communication with the pipe,
   the nozzles being adapted to direct an output of the associated fluid from the pipe
     in a diversion direction when the spray bar is in the diversion orientation, and
     in a dispensing direction when the spray bar is in the dispensing orientation;
   a first seal plate movable within the pipe interior along the pipe elongation axis,
   a second seal plate movable within the pipe interior along the pipe elongation axis, a trough, the trough comprising
   a trough inlet positioned along the diversion direction and adapted to accept the output of the associated fluid when the spray bar is in the diversion orientation,
   a trough outlet in fluid communication with the trough inlet and in fluid communication with an input of the fluid supply;

an actuator, the actuator being a pneumatic cylinder,
   operationally engaged with the spray bar,
   adapted to rotate the spray bar between the dispensing orientation and the diversion orientation.

\* \* \* \* \*